United States Patent [19]

Chesney, Jr. et al.

[11] Patent Number: 4,556,426
[45] Date of Patent: Dec. 3, 1985

[54] FUNGICIDAL GROUT COMPOSITION

[75] Inventors: Joseph J. Chesney, Jr., Plainsboro; Scott C. Broney, Trenton; George A. Ely, Ringoes, all of N.J.

[73] Assignee: Tile Council of America, Inc., Princeton, N.J.

[21] Appl. No.: 617,390

[22] Filed: Jun. 5, 1984

Related U.S. Application Data

[63] Continuation of Ser. No. 503,859, Jun. 13, 1983, abandoned, which is a continuation of Ser. No. 309,574, Oct. 8, 1981, abandoned.

[51] Int. Cl.$^4$ ................................................. C09D 5/16
[52] U.S. Cl. .............................. 106/18.32; 106/38.35; 106/90
[58] Field of Search .................. 106/89, 90, 93, 18.32, 106/18.35

[56] References Cited

U.S. PATENT DOCUMENTS

| | | | |
|---|---|---|---|
| 2,797,999 | 7/1957 | Klein | 106/89 |
| 2,820,713 | 1/1958 | Wagner | 106/93 |
| 3,030,258 | 4/1962 | Wagner | 106/93 |
| 3,215,549 | 11/1965 | Ericson | 106/93 |
| 3,290,353 | 12/1966 | Battershell et al. | 260/465 |
| 3,331,735 | 7/1967 | Battershell et al. | 167/30 |

*Primary Examiner*—Lorenzo B. Hayes
*Attorney, Agent, or Firm*—Morgan Finnegan Pine Foley & Lee

[57] ABSTRACT

New and improved fungicidal grout compositions are disclosed having a Portland cement base with a halogenated aromatic dinitrile added as an active fungicidal ingredient. The dinitrile is first wet blended with an inert solid fungicidal carrier and a surfactant, then dried and finely divided into a powder. The powder is blended with the other dry ingredients of a Portland cement grout to form a grout composition which is ready to be mixed with water to form a workable mortar for the grouting and setting of ceramic tiles. The resulting fungicidal grout compositions have improved fungicide dispersion and prolonged leach-life characteristics.

8 Claims, No Drawings

FUNGICIDAL GROUT COMPOSITION

This is a continuation of application Ser. No. 503,859 filed June 13, 1983 which is in turn a continuation of Ser. No. 309,574 filed Oct. 8, 1981, both now abandoned.

BACKGROUND OF THE INVENTION

The present invention relates to a new and improved fungicidal grout composition for use in installing ceramic, glass and stone tiles or any tile product requiring grout, i.e., prefabricated brick panels which are made to look like ceramic tile. More particularly, it relates to a wettable Portland cement based grout in which a halogenated aromatic dinitrile is added to provide a fungicidal grout composition having improved fungicide dispersion and prolonged leach-life characteristics.

Phenyl-mercurial fungicides have been added to water dispersible polymeric grout compositions in the past. However, there is increasing concern over the use of these grouts because the phenyl-mercurial fungicide may be associated with health hazards.

Other organometallic fungicides have been added to polymeric based grouts, as well as to Portland cement based grouts, in the form of organo-tin and organo-iron fungicides. These latter grout compositions have been used primarily to prevent the fouling of structures in marine environments. However, these organometallic fungicides do not disperse well in Portland cement based grouts. Although poor dispersal may be acceptable in the context of fairly large submerged structures, in the typical household bathroom situation such grouts are unsuitable because a poorly dispersed fungicide often permits spotting fungal growth to occur. In addition, the organometallic fungicides tend to be very toxic to the environment and its life forms and tend to leach out of these grout compositions after a relatively short period of time. Again, the shorter leach lives of these grout compositions may be acceptable in marine applications where the structures are specifically designed to be replaced and the volume of water is sufficient to dilute the toxic materials to an ineffective level. In the household bathroom situation, however, the laying of ceramic tiles is a meticulous, time consuming and costly operation, so that fungicide-containing grout compositions having the longest possible leach-life are desired. Since the number of bathrooms is large, a nontoxic fungicide is desired.

Halogenated aromatic dinitriles, as embodied in the present invention, are described in U.S. Pat. No. 3,331,735. In this patent, these compounds may be applied to plants for fungicidal purposes by spraying them with aqueous or organic solvent dispersions of these chemicals. Furthermore, the halogenated aromatic dinitrile compounds may also be applied to plants in the form of a plant dust, if they have first been dry blended into powders along with inert solid fungicidal adjuvants or carriers.

Accordingly, to overcome the shortcomings of prior art grout compositions, it is an object of the subject invention to provide an effective fungicidal grout composition.

It is another object of the subject invention to provide a grout composition which contains a halogenated aromatic dinitrile fungicide which is not a health hazard.

It is a further object of the subject invention to provide a fungicidal grout composition where the fungicide disperses evenly throughout the grout composition.

It is still a further object of the subject invention to provide an additive which can be added to Mason's sand and Portland cement to provide a stucco which is fungus resistant.

It is still a further object of the subject invention to provide a fungicidal grout composition having longer leach-life characteristics so that the grout composition may effectively inhibit or retard fungal growth for extended periods of time.

SUMMARY OF THE INVENTION

In accordance with these and many other objects and advantages, the subject invention provides a new and improved fungicidal grout composition for use in the laying and setting of ceramic tiles. More particularly, the new and improved fungicidal grout compositions of the subject invention include Portland cement based grout compositions containing fungicidal amounts of halogenated aromatic dinitriles which have been blended with a carrier and modified into powder form. Water is added to the mixture to obtain workability and to take part in the hardening or curing action by means of which the cement forms a gel. The resultant grout composition has the fungicidal compounds well dispersed throughout. Further, it has been found that the subject grout composition exhibits longer leach-life, thereby extending the effective fungicidal properties of the grout over a longer period of time.

In the preferred embodiments, the grout compositions have a Portland cement base in which other components known to the art have been added. For example, calcium carbonate may be added to act not only as a water insoluble filler material, but also as an inert solid carrier for the halogenated aromatic dinitrile. In addition, urea and methyl cellulose may be added as hygroscopic agents to aid in retaining moisture which improves the workability of the grout and retards the setting time thereby avoiding the cracking associated with grouts having too rapid a curing time. Further, the halogenated aromatic dinitriles impart a greyish tone to the grout composition so that the coloring agent titanium dioxide may be added to improve the whiteness of the resultant grout composition. Particularly preferred embodiments of the aforesaid compositions are those in which the halogenated aromatic dinitrile used is tetrachloroterephthalonitrile (chlorothalonil) which has been dry blended with an appropriate carrier into a water soluble or dispersible powder. The grout compositions of the subject invention are in the form of solid mixtures which are ready to be mixed with water to form workable mortars for the setting of ceramic tiles.

DETAILED DESCRIPTION OF THE INVENTION

The novel grout compositions of the subject invention are well suited for grouting and filling joints between ceramic tiles and for adhering these tiles to various backings. The grout and mortar products resulting from the use of these compositions are especially desirable because they have excellent wet characteristics such as good trowelability and slow curing times, and in their dry state as white in color, stain resistant and combat fungal growth for prolonged periods of time. In a preferred embodiment, the novel grout compositions of this invention comprise: (a) a halogenated aromatic dinitrile which has been dry blended with an inert solid fungicidal carrier into a water soluble or dispersible form; (b) a water insoluble filler; and (c) wettable Portland cement in the following preferred amounts:

(a) from about 0.25 to about 12% by weight;
(b) 0 to about 50% by weight;
(c) from about 50 to about 99% by weight.

The first important component of the new and improved grout compositions of the subject invention is the fungicide in the form of a halogenated aromatic dinitrile. The halogenated aromatic dinitriles which are useful in the subject invention may be represented by the general formula:

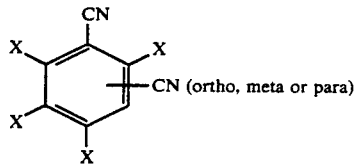

wherein each X is hydrogen or a halogen, i.e., chlorine, fluorine, and bromine, with at least one X being halogen. These dinitriles are more commonly designated in the art as phthalonitriles (ortho), isophthalonitriles (meta) and terephthalonitriles (para). The following list of halogenated aromatic dinitriles for use herein is representative of the many compounds which may find application: tetrachloroterephthalonitrile; tetrafluoroterephthalonitrile; tetrachloroisophthalonitrile; difluorodichloroterephthalonitrile; 5-chloro-2,4,6-trifluoroisophthalonitrile; 2,3-dichloroterephthalonitrile; chlorotrifluoroterephthalonitrile; tetrafluoroterephthalonitrile; 4,6-dichloroisophthalonitrile; 2,5-dichloroterephthalonitrile; 2-chloroterephthalonitrile; 2-fluoroterephthalonitrile; tetrachlorophthalonitrile; 2-bromoterephthalonitrile; 2-chloro-3-fluoroterephthalonitrile; 2,3-difluoroterephthalonitrile; 2-chloro-5-fluoroterephthalonitrile; 2,5-difluoroterephthalonitrile; 2,5-dibromoterephthalonitrile; 2,3,5-trichloroterephthalonitrile; dichlorodifluoroisophthalonitrile; trichlorofluoroisophthalonitrile; 4,6-difluoroisophthalonitrile; 4-bromoisophthalonitrile; tetrafluorophthalonitrile; 4-chloroisophthalonitrile; 3,4-dichlorophthalonitrile; chlorotrifluorophthalonitrile; dichlorodifluorophthalonitrile; trifluoroterephthalonitrile; 4-bromo-6-fluoroisophthalonitrile; 2-chloroisophthalonitrile; 4-chloroisophthalonitrile; 2,4-dichloroisophthalonitrile; 2-fluoroisophthalonitrile; 4-fluoroisophthalonitrile; 2-fluoro-4,5,6-trichloroisophthalonitrile.

The halogenated aromatic dinitriles for use with the subject invention generally may be prepared as described in U.S. Pat. No. 3,290,353. Typically, such preparations involve conversion of a ring-halogenated, i.e., chlorinated or brominated, acid chloride to the corresponding ring-halogenated amide by the treatment thereof with ammonia. The halogenated amide compound obtained is then dehydrated to give the desired chlorinated or brominated dinitrile. Alternatively, tetrahalogenated aromatic dinitriles may be prepared in good yield from the corresponding isomers by ammoxidizing the xylene to the dinitrile isomer followed by vapor phase, catalytic chlorination thereof. Additionally, it is also possible to prepare these compounds by amidation of the corresponding halogenated dicarboxylic acid. The diamide obtained is then dehydrated to the desired halogenated dinitrile. The fluorinated dinitriles generally may be prepared from the chlorinated dinitriles by a halogen interchange whereby chlorine is replaced by fluorine. Typically, the chlorinated compound is reacted with an alkali metal fluoride, for example, potassium fluoride.

Exhibiting outstanding biological activity, the halogenated aromatic dinitriles are particularly useful as fungicides. In the practice of this invention, the aforementioned dinitriles are dry blended with finely divided inert fungicidal carriers or adjuvants. A representative list of the carriers which can be used for this purpose includes: talc, lime, quartz, pumice, soybean flour, alumina trihydrate, lignin, diatomaceous earth, calcium carbonate, silica, wheat flour, and tripoli.

Generally, a dry mixture of the solid fungicidal carrier and fungicide is blended and then dried in warm air and crushed to a fine powder. High fungicide to carrier ratios by weight are desirable and generally preferred are mixtures comprising from 50% by weight fungicide and 50% by weight fungicidal carrier, up to 90% by weight fungicide and 10% carrier. The exact percentages are not as important as long as the fungicide content by weight of the overall composition approaches a range of from about 0.25 to about 12%, optimally 6%. A 75% active ingredient dry mixture utilizing tetrachloroterephthalonitrile (chlorothalonil) as the fungicide is sold under the trademark N-96 BRAVO WS-75 by the Diamond Shamrock Corporation. This admixture is then blended with the other components of the subject invention to provide a new and improved grout composition.

The second important component is the water insoluble filler material. Examples of filler materials which may be employed are glass, such as crushed glass, silica, barytes, alumina, various clays, diatomaceous earth, and other like inert materials, wollastonite, mica, flint powder, kryolite, alumina trihydrate, talc, sand, pyrophyllite, blanc fixe, granulated polyethylene, zinc oxide, and mixtures thereof. A preferred combination consists of limestone and lime. The amount of filler is in the range from 0 to 50% by weight of the composition. The filler is water insoluble; therefore, when it is combined with the other ingredients of the composition it will be emulsified, dispersed, or suspended therein.

The third important ingredient of the subject composition is Portland cement, present in an amount of from about 50 to about 99% by weight. Portland cement is preferred because of its bond strength, low cost and ease of application.

In addition, there may also be added to the composition other ingredients which are generally used to prepare mortar or grout compositions. For example, hygroscopic wetting agents may be added to retain moisture. Illustrative examples of these agents include glycerine, calcium chloride, amines, urea, certain nitrates, methyl cellulose, hydroxyethyl cellulose, ethylcellulose and carboxymethyl hydroxyethyl cellulose. Since such materials are known to be useful in the preparing of grout compositions, the additive amounts are known to those who work in this art. However, it is preferred in the subject invention to include methyl cellulose 0.2–0.5% by weight, and urea 0.05% by weight. The methyl cellulose while acting as a water retentive agent also acts as a surface active dispersing agent which causes the fungicidal formulation to be easily dispersed in water.

Coloring agents may also be added to the composition to produce desired effects. Illustrative of coloring materials which may be added are titanium dioxide, cadmium red, carbon black, aluminum powder and the like. In the embodiment described herein a white grout composition is more generally desirable. The halogenated aromatic dinitrile tends to impart an off-white or dull, grayish tone to the composition whereby it may be desired to add titanium dioxide to improve the whiteness of the end product.

The present invention is also concerned with the application of the herein disclosed compositions in setting and grouting tile. They are particularly adapted for use as trowelable grouts or mortars to ceramic tiles and to fill the joints between the tiles. The compositions bind well to the ceramic tile edges and to the backs of the ceramic tiles. In grouting, an assembly containing a plurality of ceramic tiles in edge to edge relationship with spaces between the tiles is prepared and the spaces between the tile filled with the compositions of this invention. When used to set and grout ceramic tile the compositions form a hard, adherent, stain resistant and fungus resistant bond between the backs of said ceramic tile and the substrate, as well as between the tiles.

Additionally, this invention is concerned with the article of construction consisting of the ceramic tile product comprising ceramic tile in which the spaces therebetween are grouted with the herein disclosed compositions.

The following examples are provided for illustrative purposes and include particular features of the invention, however, the examples should not be construed as limiting the invention, many variations of which are possible without departing from the spirit of scope thereof.

EXAMPLE I

The following test measures the ability of fungicidal grout compositions made according to this invention to inhibit fungal growth.

A mixture was prepared containing the following components:

| Components | Percentages by weight |
| --- | --- |
| 1. Wettable Portland cement | 68.65% |
| 2. Limestone | 18.3% |
| 3. Lime | 1.0% |
| 4. Methyl cellulose | 0.5% |
| 5. Urea | 0.05% |
| 6. N-96 BRAVO WS-75 | 7.5% |
| 7. Titanium dioxide (TiO$_2$) | 4.0% |

The above composition was prepared by mixing the components in a low speed mixer. It was then ready to be mixed with water to form a grout composition for tile. Next, slant cultures of *Aspergillus niger* were prepared. The agar employed was potato Dextrose Agar. The agar was heated to a liquid state and was poured into slanted test tubes, and allowed to harden. To the agar slants a spore suspension of the *A. niger* was added. The slant cultures of *A. niger* were then incubated at 30° C. for a period of seven days.

A testing panel was fashioned out of four one-inch square ceramic tiles adhesively bonded to a backing. The tiles were aligned edge to edge to form a larger square, with the spacing between each of the tiles defining a one-fourth inch grout joint. The test panel was then autoclaved and sterilized.

The above composition was then mixed with water until a workable grout composition was formed. The grout was then applied to the test panels by means of a rubber backed trowel with the grout composition filling each of the grout joints between the tiles and being spread uniformly on the tile surface. The grouted test panel was then cured for a period of seven days at room temperature. When the grout on the panels had dried and set, the test panel was placed within a sterilized pan. Liquid PDA agar was then poured over the surface of the test panel and into the petri dish so as to form an agar film 1/32nd to 1/16th of an inch thick over the surface of the test panel, and was allowed to harden.

Next, a suspension was made to innoculate the test panels with the *A. niger* fungus. The spore suspension was prepared by first making a sterile stock emulsifier solution of Triton X-100 at 50 ppm. To do this the 500 mls of Triton X-100 were dissolved in 100 mls of water. This yielded a stock emulsifier solution having a concentration of 1,000 ppm. The solution was then diluted with water to 50 parts per million and was then sterilized.

Secondly, five mls of the sterilized emulsifier solution were introduced to the slant culture of *A. niger*. The slant tube was shaken and the solution decanted into another test tube containing glass beads 1/16th of an inch in diameter. Then, five more mls of the sterile solution were added to the slant to rewash the slant and this solution was then decanted to the test tube with the glass beads. The test tube with the glass beads was held vertically and the bottom was tapped several times. The spore suspension was then withdrawn by pipet through cotton to remove the fungus *A. niger*. The grouted test panel was then innoculated with the spore suspension with one drop being placed on each of the corners of each tile. The panels were covered and placed in an incubator at 30° C. for fourteen days. At the end of that period the results were recorded using a 0 to 5 rating system for quantities of fungal growth in which:

0=no growth on grouted tile surface
1=0–20% growth on grouted tile surface
2=20–40% growth on grouted tile surface
3=40–60% growth on grouted tile surface
4=60–80% growth on grouted tile surface
5=80–100% growth on grouted tile surface This procedure was followed for many test panels and in each instance the result was "0" that is, no fungal growth on the tile surface, even though fungal growth did occur on the excess agar within the petri dish. Also tested simultaneously was a control which consisted of the formulation of Example I, except for fungicide and TiO$_2$. The control exhibited extensive growth over the grout joints.

EXAMPLE II

The following test measures the ability of the fungicidal grout compositions of the subject invention to resist fungal attack after prolonged periods of being sprayed with water. The test was designed to roughly approximate the leaching effects withstood by grout compositions in a typical shower stall in a bathroom used by a family of four for a period of approximately three years. As described in Example I, a grout composition was prepared, and several test panels were prepared.

The test panels were bonded to two separate 10"×10" planar backings in edge to edge fashion to simulate two sections of a tiled wall of a shower stall. As in Example I, the grout composition was trowelled so as to fill the grout joints between the tiles and to cover the surface of the tiles uniformly. The grout composition was then cured at room temperature for a period of hours.

A test shower stall having the dimensions 26"×15"×30" was equipped with five shower heads arranged on a front wall of the stall. At the back wall of the stall the two 10"×10" test wall panels containing the grouted tiles were placed one over the other. The lower test wall panel was set at an incline such that the water running off from the vertical top wall panel would hit and run down the surface of the lower wall panel. The shower heads were directed so that the water would spray the top wall panel and water was sprayed on the grouted tiles for a calculated period of time.

The time period calculated was based upon a calculation of the water volume used by a family of four in a year. Typical shower heads deliver two gallons of water per minute. Assuming that each family member takes a ten minute shower each day, the water used will be 80 gallons per day, i.e., 2 gals/min×10 mins×4=80 gals. At the rate of 80 gallons per day the water volume used by a family of four per year is 29,200 gallons.

In the test shower stall, five shower heads, each delivering 2 gallons of water per minute were provided. The water flow with all of the shower heads fully operative was 10 gals per minute or 600 gals per hour, or 4,800 gallons in an eight hour period, corresponding to one workday. In the test shower stall, the showers must be run for 6.083 workdays to provide the same water volume as that used by a family of four in one year, 12.16 workdays to equal 2 years of family use, 18.29 workdays to equal 3 years and so on.

The two test wall panels in the test shower stall were subjected to the leaching effects of 18 workdays of water flow which roughly corresponds to the water use of a family of four over a period of 3 years. After that time period the grouted wall panels were removed from the stall and were sterilized in an autoclave. As in Example I, PDA agar was poured to completely cover the test wall panels with a thin film of agar. The test panels were then innoculated with the fungus, *A. niger*, by placing a drop of the spore suspension solution at each of the corners of each of the tiles on the test wall panels. The test wall panels were then placed in an incubator set at 30° C. for a period of 14 days, after which time the panels were removed and the results recorded on the same 0 to 5 rating system of Example I. It was found that after leaching, the test panels grouted with the new and improved compositions of the subject invention received ratings of "0" corresponding to the fact that the grouted surfaces and joints between the tiles contained no fungal growth. The control panel containing no fungicide again, demonstrated extensive growth over the grout joints.

Furthermore, the fungicide and $TiO_2$ containing panels appeared whiter after leaching than the control panels.

EXAMPLE III

The following is an example of a stucco formulation. A mixture was prepared using the following components and found to be suitable as a stucco which would resist fungus growth:

| Components | Percentage by weight |
|---|---|
| 1. Example I Grout | 5 |
| 2. Mason's Sand | 60 |
| 3. Wettable Portland Cement | 35 |

It should be understood by those skilled in the art that various modifications may be made in the present invention without departing from the spirit and scope thereof as described in the specification and defined in the appended claims.

What is claimed is:

1. A fungicidal grout composition for mixing with water which comprises:
   (a) from about 50 to about 99% by weight of a wettable Portland cement;
   (b) from about 0.25 to 12.0% by weight of a dry blended mixture, said mixture comprising from about 50% to about 90% by weight of a halogenated aromatic dinitrile and from about 10% to about 50% by weight of a finely divided inert solid fungicidal carrier;
   (c) from 0 to 50% by weight of a water insoluble filler;
   (d) from about 0.2 to about 0.5% by weight of a hygroscopic agent; and
   (e) from 0 to about 10% by weight of a coloring agent.

2. A fungicidal grout composition as claimed in claim 1 wherein said halogenated aromatic dinitrile is selected from the group comprised of: tetrachloroterephthalonitrile; tetrafluoroterephthalonitrile; tetrachloroisophthalonitrile; difluorodichloroterephthalonitrile; 5-chloro-2,4,6-trifluoroisophthalonitrile; 2,3-dichloroterephthalonitrile; chlorotrifluoroterephthalonitrile; tetrafluoroterephthalonitrile; 4,6-dichloroisophthalonitrile; 2,5-dichloroterephthalonitrile; 2-chloroterephthalonitrile; 2-fluoroterephthalonitrile; tetrachlorophthalonitrile; 2-bromoterephthalonitrile; 2-chloro-3-fluoroterephthalonitrile; 2,3-difluoroterephthalonitrile; 2-chloro-5-fluoroterephthalonitrile; 2,5-difluoroterephthalonitrile; 2,3,5-trichloroterephthalonitrile; dichlorodifluoroisophthalonitrile; trichlorofluoroisophthalonitrile; 4,6-difluoroisophthalonitrile; 4-bromoisophthalonitrile; tetrafluorophthalonitrile; 4-chloroisophthalonitrile; 3,4-dichlorophthalonitrile; chlorotrifluorophthalonitrile; dichlorodifluorophthalonitrile; trifluoroterephthalonitrile; 4-bromo-6-fluoroisophthalonitrile; 2-chloroisophthalonitrile; 4-chloroisophthalonitrile; 2,4-dichloroisophthalonitrile; 2-fluoroisophthalonitrile; 4-fluoroisophthalonitrile; 2-fluoro-4,5,6-trichloroisophthalonitrile.

3. A fungicidal grout composition as claimed in claim 1 wherein said inert solid fungicidal carrier is selected from the grout consisting of talc, diatomaceous earth, lime, calcium carbonate, quartz, silica, pumice, wheat flour, soybean flour, tripoli, alumina trihydrate and lignin.

4. A fungicidal grout composition as claimed in claim 1 wherein said halogenated aromatic dinitrile is tetrachloroterephthalonitrile.

5. A fungicidal grout composition as claimed in claim 1 wherein said water insoluble filler further comprises a mixture of calcium carbonate from 8 to 19% by weight and lime from 1 to 3% by weight.

6. A fungicidal grout composition as claimed in claim 1, wherein said hygroscopic agent comprises a mixture of methyl cellulose, 0.5% by weight, and urea, 0.05% by weight.

7. A fungicidal grout composition as claimed in claim 1 wherein said coloring agent is titanium dioxide.

8. A fungicidal stucco composition which comprises from about 40 to about 70% by weight of Mason's sand, from about 30 to about 60% by weight of a wettable Portland cement and from about 0.5 to about 15% by weight of a grout composition as claimed in claim 6.

* * * * *